(No Model.)

S. FOX.
APPARATUS FOR CORRUGATING TUBES.

No. 297,372. Patented Apr. 22, 1884.

Witnesses
Thos. E Craven C.E.
Wm Sadler.

Inventor:
Samson Fox

UNITED STATES PATENT OFFICE.

SAMSON FOX, OF HARROGATE, COUNTY OF YORK, ENGLAND.

APPARATUS FOR CORRUGATING TUBES.

SPECIFICATION forming part of Letters Patent No. 297,372, dated April 22, 1884.

Application filed September 25, 1883. (No model.) Patented in England November 15, 1881, No. 5,008; in Belgium May 26, 1882, No. 58,030, and in Germany June 2, 1882, No. 21,533.

*To all whom it may concern:*

Be it known that I, SAMSON FOX, a subject of the Queen of Great Britain and Ireland, residing at Harrogate, in the county of York, Kingdom of Great Britain and Ireland, have invented new and useful Improvements in Apparatus for Corrugating Tubes to be Used for Internal Fire-Boxes and Flues and for the Outer Shells of Steam-Boilers, (for which I have obtained a patent in Great Britain, No. 5,008, bearing date November 15, 1881; in Belgium, No. 58,030 B, bearing date May 26, 1882, and in Germany, No. 21,533, bearing date June 2, 1882,) of which the following is a specification.

My invention relates to a machine for bending into the form of corrugated tubes plates that have been previously corrugated by any suitable means, whether throughout their entire length or otherwise, and whether such plates be straight in the longitudinal direction of the corrugations, or have been partially curved in the said direction during the process of corrugating. My machine comprises a pair of suitably mounted and driven rolls having corrugations or annular grooves and projections around their peripheries at right angles to their axes, one of which rolls is made adjustable and arranged to be operated by steam, hydraulic, or other power, for causing the adjustable roll to approach the other for gripping the corrugated plate to be operated upon, a third roll so mounted in movable bearings as to be changeable in position in relation to the two first-named rolls, and means for so moving said third roll.

Figure 1:
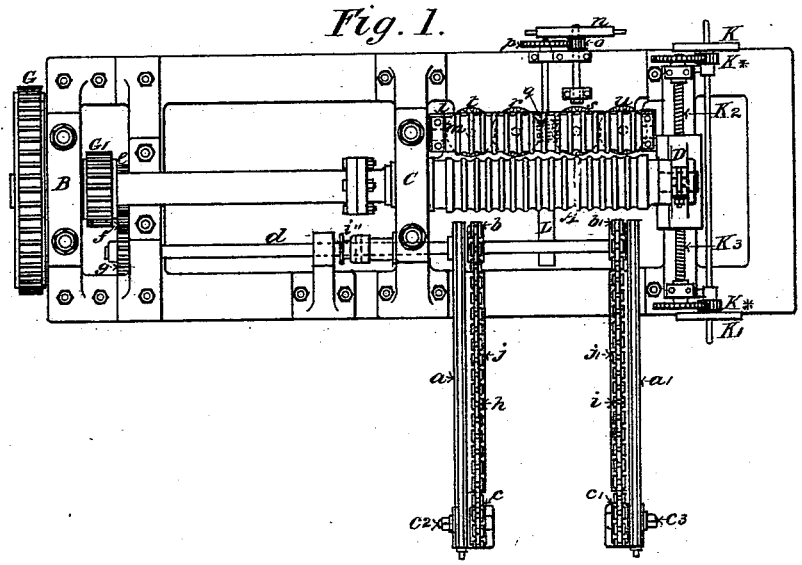
Figure 2:
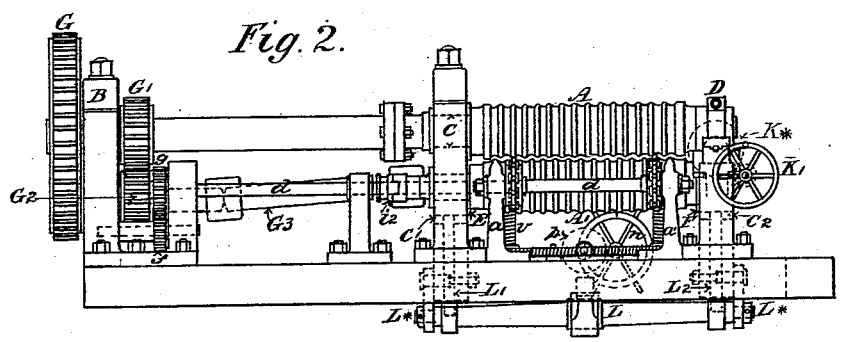
Figure 3:
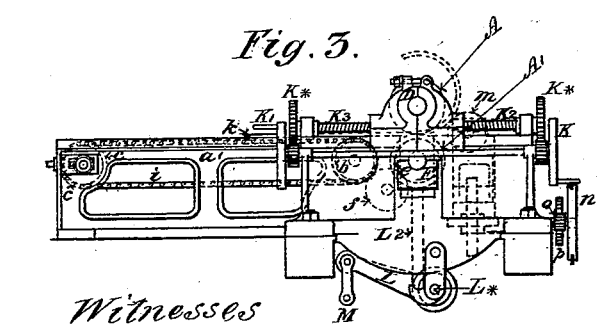
Figure 4:
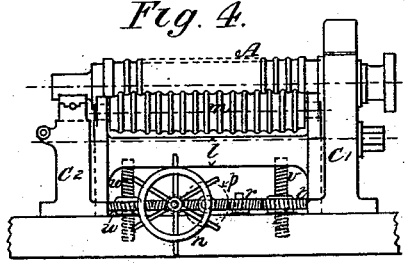

Referring to the accompanying drawings, (which form part of this specification, and wherein the same letters are always used to denote like parts wherever repeated,) Figure 1 is a plan. Fig. 2 is a front elevation; Fig. 3, an end elevation; and Fig. 4 is a part back elevation, showing a machine for bending corrugated metallic plates into the form of corrugated tubes according to this invention.

The top roll, A, is mounted in the bearings B, C, and D, and forms the principal driven and one of the gripping rolls, G being the driving-wheel. A' is the other or corresponding gripping-roll, mounted in the bearings E and F, these bearings having a vertical movement in the housings C' and C². Both the top roll, A, and the bottom roll, A', have annular grooves and projections formed on their peripheries, corresponding with the corrugations of the plates to be operated upon, said grooves and projections being so relatively arranged that the projections of one roll take into or are opposite to the grooves of the other. The roll A' is suitably driven from the motive power by the gearing G' G² and the connecting-spindle G³. When a corrugated plate is introduced between the two said gripping-rolls A and A', the latter is caused to approach the former by a system of levers, L, having their fulcra at L*, and the toggles L' and L² acting, respectively, on the movable bearings E and F, which carry the roll A'. In place of hand-power, steam, hydraulic, or other power may be brought to bear on the lever L at M.

$a$ and $a'$ are the frame-work or guides placed before the gripping-rolls A and A', for the reception and correct guidance of a corrugated plate to the action of the rolls. The said frame-work carries a shaft, $d$, which is driven from one of the roll-pinion shafts, G², by a train of gearing, $e\ f\ g$. On the shaft $d$ are two chain-wheels, $b$ and $b'$, and at the outer end of said frame-work $a$ and $a'$ are two corresponding and adjustable chain-wheels, $c$ and $c'$, on movable studs $c''$ and $c'''$. Around each pair of the before-named chain-wheels is placed an endless chain, $h$ and $i$, capable of being stretched by the aforesaid adjustable studs, and between each pair of chain-wheels I support the upper line of chain by a projecting shelf-like part, $j$ or $j'$, of said frame-work. On one or more links of each chain I provide a projection, $k$, suitable for pressing against the rear edge of a corrugated plate, and to assist in passing the plate through the "bite" of the gripping-rolls for the purpose of forming it into a tube.

It is evident that in place of chains and chain-wheels other appliances—such as spur-wheels and racks or other equivalent devices— might be employed, provided with hooks or projections to assist in causing the plate to enter the gripping-rolls and to travel along, notwithstanding the bending action of the third roll.

The shaft $d$ is in two parts and provided with a connecting-clutch, $i''$, for starting the entrance of a corrugated plate into the bite of the gripping-rolls A and A′, after such plate has been placed upon the guides $a$ and $a'$, the said clutch being disconnected on the completion of the bending operation. When the clutch is engaged, (any suitable lever mechanism may be employed for this purpose,) the shaft $d$ is rotated by the gearing $e\ f\ g\ G^2$, and with it the chain-carrying wheels $b\ b'$. Thus the corrugated plate is pressed forward into the bite of the rolls A A′ by the moving chain. When the corrugated plate has been carried beyond the guides $a\ a'$, the clutch is disconnected, the shaft $d$ and the chain-wheels cease to rotate, the movement of the chain is arrested, and the apparatus is in condition to receive another plate for a new operation. On a suitable and adjustable carriage, $l$, behind the gripping-rolls A and A′, I mount in bearings a third roll, $m$, which I will call the "bending-roll," and which is caused to bear against the under side of the corrugated plate as it passes between the gripping-rolls A and A′, and in order to give it the curvature for forming the required tube. This roll is shown as corrugated and arranged so that its corrugations coincide with those of the plate passing through the main or gripping rolls. It, however, may be plain. This carriage, in which the bending-roll is mounted, is shown capable of being moved vertically past the bite of the gripping-rolls (or, if desired, this movement may be at any other suitable angle) by the hand-wheel $n$, gearing $o\ p$, endless screw $q$, and the train of helical gearing $r\ s\ t\ u$, the latter two members of the train having internal screw-threads for the screws $v$ and $w$, which are fixed to the before-named movable carriage $l$. By this means the bending-roll $m$ may be raised or lowered at pleasure. It is evident that this result may also be attained by power being applied for this movement either by a system of levers or hydraulic pressure, or by a combination of the two. When a tube has thus been formed, it surrounds the top gripping-roll, A, and may be removed therefrom by successively lowering the gripping-roll A′ and the bending-roll $m$, and opening the bearing D by means of the hand-wheels K and K′, gearing K*, and the screws K$^2$ and K$^3$, and thus freeing the end of the top roll, A, for the tube to pass over, after which and the said end bearing has been closed the machine is again ready for proceeding with the formation of another tube.

What I claim is—

In a machine for bending corrugated plates into corrugated tubes, suitable guides adapted, as shown, to engage with a groove or grooves of a plate and guide it into the bite of the main rolls, in combination with the endless chains or their equivalents, provided with projections for taking or bearing against the rear edge of the plate, the pulleys for carrying the endless chains, one pair of which pulleys is driven at greater power to press the plate into the bite of the main rolls and to overcome the resisting action of the bending-roll in forming the tube, and means for arresting the movement of the endless chains when the rear edge of the plate has approached the bite of the main rolls, substantially in the manner as herein described.

SAMSON FOX.

Witnesses:
    THOS. E. CRAVEN,
C. E., 24 *Victoria Chambers, Leeds, Fell. Inst., Patent Agent.*
    WM. SADLER,
*Leeds, Clerk to Mr. Craven.*